United States Patent [19]

Balogh

[11] Patent Number: 5,793,625
[45] Date of Patent: Aug. 11, 1998

[54] BOOST CONVERTER REGULATED ALTERNATOR

[75] Inventor: W. Thomas Balogh, Houston, Tex.

[73] Assignee: Baker Hughes Incorporated, Houston, Tex.

[21] Appl. No.: 788,748

[22] Filed: Jan. 24, 1997

[51] Int. Cl.[6] ............................................. H02M 7/06
[52] U.S. Cl. .......................... 363/89; 323/222; 323/223
[58] Field of Search ................................. 323/210, 222, 323/223; 363/89

[56] References Cited

U.S. PATENT DOCUMENTS

| | | | |
|---|---|---|---|
| 4,677,366 | 6/1987 | Wilkinson | 323/222 |
| 4,688,162 | 8/1987 | Mutch et al. | 363/80 |
| 5,414,613 | 5/1995 | Chen | 363/52 |
| 5,502,630 | 3/1996 | Rokhvarg | 363/89 |
| 5,625,549 | 4/1997 | Horvat | 363/132 |

OTHER PUBLICATIONS

Prasad, et al. "Active Input Current Waveshaping Method for Three–Phase Diode Rectifiers with Zero Switching Losses", IEEE/IAS Annual Meeting, May 1991, Conference Record, pp. 932–938.

Primary Examiner—Jeffrey L. Sterrett
Attorney, Agent, or Firm—Madan & Morris, PLLC

[57] ABSTRACT

A circuit that involves the application of boost mode regulator techniques is used to regulate the output of an a.c. source. The source inductance becomes part of the boost mode circuit, thus avoiding the losses associated with the addition of external inductors. When a three-phase alternator is the power source, the circuit comprises a six diode, three-phase rectifier bridge, three FET transistors and a decoupling capacitor. The invention involves shorting the output of the power source to allow storage of energy within the source inductance. During this time, the decoupling capacitor supports the load. When the short is removed, the energy stored in the inductances is delivered to the load. Because the circuit uses the integral magnetics of the source to provide the step-up function, the efficiency of the design can be quite high.

22 Claims, 8 Drawing Sheets

BOOST CONVERTER REGULATED ALTERNATOR

FIELD OF THE INVENTION

The invention relates to the regulation of the output voltage of an alternator over a range of speeds. Specifically, the invention is an apparatus that involves the application of boost mode regulator techniques to alternator power generation.

BACKGROUND OF THE INVENTION

In many applications such as automotive applications, an alternator AC output voltage is converted to a DC voltage. This DC voltage can be used to charge a battery, provide power to a variety of electromechanical devices, and supply power to semiconductor electronic circuits. DC generators could be used for the purpose but they are complicated and unreliable. DC generators use commutator brushes that wear out and are often a source of noise. Consequently, alternators are often used for the purpose. Other applications are found in the petroleum exploration industry, where a downhole alternator, connected to a turbine driven by drilling mud, is used as a downhole power source in directional drilling operations.

A main disadvantage of an alternator is that the AC output voltage of an alternator changes with the speed of the main alternator shaft. Some applications require that the output voltage of the alternator remain constant over a wide range of the alternator shaft speed. In prior art, there are two ways of solving this problem. One method is to have an extra winding, called a field winding, in the alternator. This field winding adds to or subtracts from the magnetic flux of the permanent magnet of the alternator. By controlling the current in the field winding, the total magnetic field and hence the alternator voltage can be controlled. A second method involves the use of a rectifier bridge to convert the alternator AC output to a DC voltage; thereafter, the DC voltage is regulated by a DC to DC converter.

The advantage of the field winding design is that is usually results in a much simpler electrical control circuit than would be required for direct regulation of the alternator output. However, this extra winding has several disadvantages. It complicates the alternator design, it increases the number of connections to the alternator, adds to the weight of the alternator and it reduces the overall power capability of the alternator for a given alternator size.

Regardless of the regulator method employed, the alternator AC voltage must be converted to a DC voltage for most applications. A commonly used arrangement for generation of DC voltage from a three phase alternator is shown in FIG. 1A. It incorporates a six diode rectifier bridge that selectively applies the most positive and the most negative potential of each alternator phase to the load. The problem with simple diode rectification is that it can be very inefficient. During certain time intervals, one of the three phases may have a positive phase voltage and a zero phase current. This means that at a time when it could be providing power, no power is delivered from this phase.

The efficiency of power utilization can be improved by applying the concepts employed in a boost mode regulator. A simplified circuit diagram is shown in FIG. 2A. The illustration assumes a DC power source and an external resistance and inductance. A Field Effect Transistor (FET) Q1 is used to short the series connected source circuit for a time that is small in comparison to the time constant of the source circuit (defined as the ratio of the inductance to the resistance). During the shorting interval, the voltage across the inductor increases linearly. When the FET is turned off, the voltage across the inductor reverses. In this state, the voltage across the inductor adds together with that of the source to produce a voltage greater than that of the source alone. In this manner, the circuit of FIG. 2A boosts the output of the source voltage. The amount of the boost is determined by the FET on time duty cycle and the ratio of the load resistance to the source resistance.

The inventions of Wilkinson (U.S. Pat. No. 4,677,366) and of Mutoh et al. (U.S. Pat. No. 4,688,162) disclose methods of improving the power factor of a rectifier control apparatus connected to a single phase AC power supply. Wilkinson uses a boost converted while Mutoh uses a chopper circuit to improve the power factor. Both designs use inductors as energy storage elements of the design.

Prasad discloses a power conversion circuit operating in discontinuous conduction mode connected to a three-phase power supply. It utilizes only one switching device on the dc side of a six diode rectifier bridge rectifier to shape the line current. While this results in fewer components and simplified control and drive circuitry, the load on the switching device is substantially increased. Also, the circuit uses an input filter and to accommodate a smaller input filter, the power device has to switch at a higher frequency. There is a practical limit to the frequency imposed by losses in the switching means.

The invention of Chen (U.S. Pat. No. 5,414,613) teaches a device similar to that of Prasad except for the addition of a snubber network. The snubber network reduces the switching losses and stresses on the switching device. This enables the device to operate at higher frequencies. In the teachings of Wilkinson, Mutoh, Prasad and Chen, the power source itself is idealized, having no resistance or inductance. There are many applications where this assumption is not true. In particular, where the power source is an alternator with an impedance that is comparable to the impedance of the load, the power source can no longer be treated as a constant voltage source and the conversion circuit cannot be analyzed independently of the source. This is particularly important in hydrocarbon exploration where both the alternator and the load are near the bottom of a well that may be thousands of meters deep. In these applications, maintaining high efficiency is important. In addition, in downhole applications, the diameter of the alternator is limited by the size of the wellbore. As would be familiar to those knowledgeable in the art, a small diameter alternator requires that the alternator have more winding turns, resulting in a higher inductance.

There is a need for an invention that treats the entire circuit (alternator, converter and load) as a single system. There is also a need for a device that takes advantage of the inductance of the alternator to provide a regulated output, rather than by adding additional inductances and the accompanying losses, to the circuit. There is need for a device that reduces the losses of the standard six-diode rectifier bridge and improves the power factor.

The present invention satisfies this need.

SUMMARY OF THE INVENTION

The invention is a circuit and method that involves the application of boost mode regulator techniques to alternator power generation. With this invention, the alternator inductance becomes part of the boost mode circuit, thus avoiding the losses associated with the addition of external inductors. The circuit combines a three phase alternator, a six diode, three-phase rectifier bridge, three FET transistors and a decoupling capacitor. The invention involves literally shorting the phase outputs of a three phase alternator together to allow storage of energy within the alternator inductance. During this time, the decoupling capacitor will support the load. When the short is removed, the energy stored in the inductances will be delivered to the load. Like a boost mode power supply, the alternator boost circuit can directly boost the raw output voltage of an alternator. The circuit uses the integral magnetics of the alternator to provide the step-up function; therefore the efficiency of the design can be quite high.

DETAILED DESCRIPTION OF THE INVENTION

Prior Art

Figure 1A:
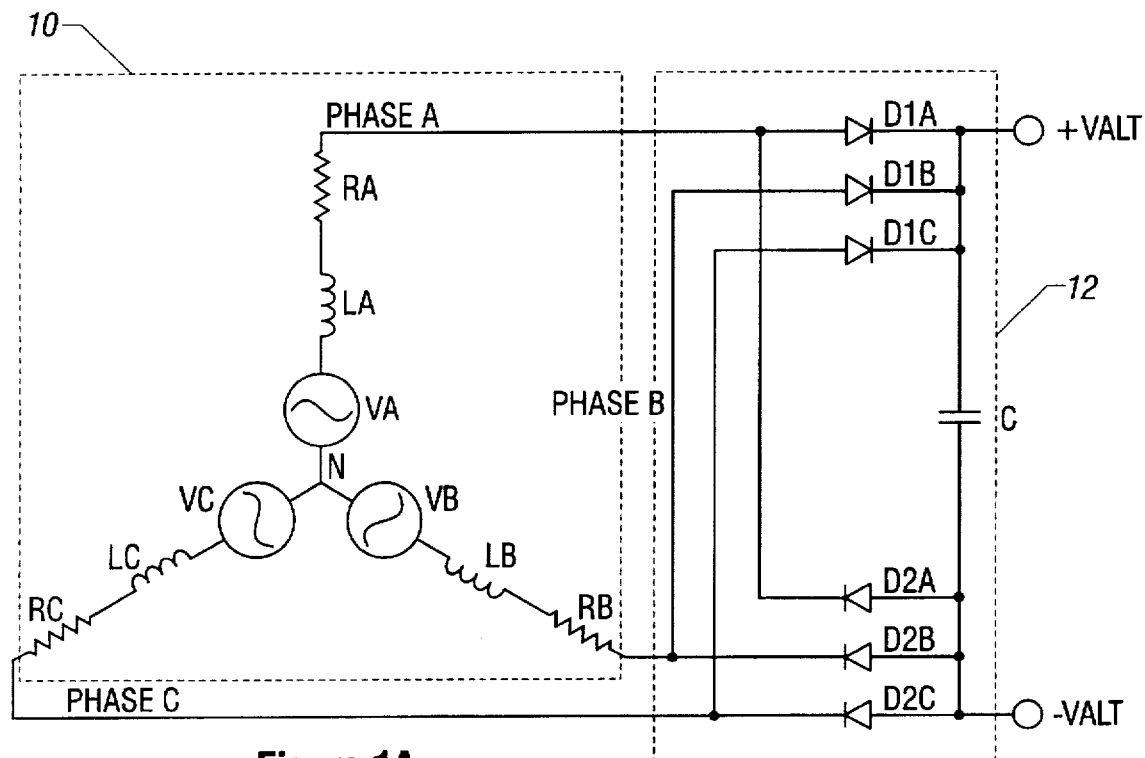
FIG. 1A shows a prior art method for converting a three-phase alternator output to a DC output.

The present invention is best understood by first referring back to prior art methods of obtaining DC output from a three phase alternator. FIG. 1A shows a six diode full wave rectifier bridge, 12, connected to a "Y" connected three-phase alternator, 10. The three phases each have a voltage source, labeled VA, VB and VC that are connected to a common neutral, N. Each of the three phases of the alternator has an associated resistance and inductance, labeled RA, LA, RB, LB, RC and LC. The six diodes are D1A, D1B, D1C, D2A, D2B and D2C. The three D1 diodes provide the positive output while the three D2 diodes provide the negative output. The decoupling capacitor C is placed between the output terminals.

Figure 1B:
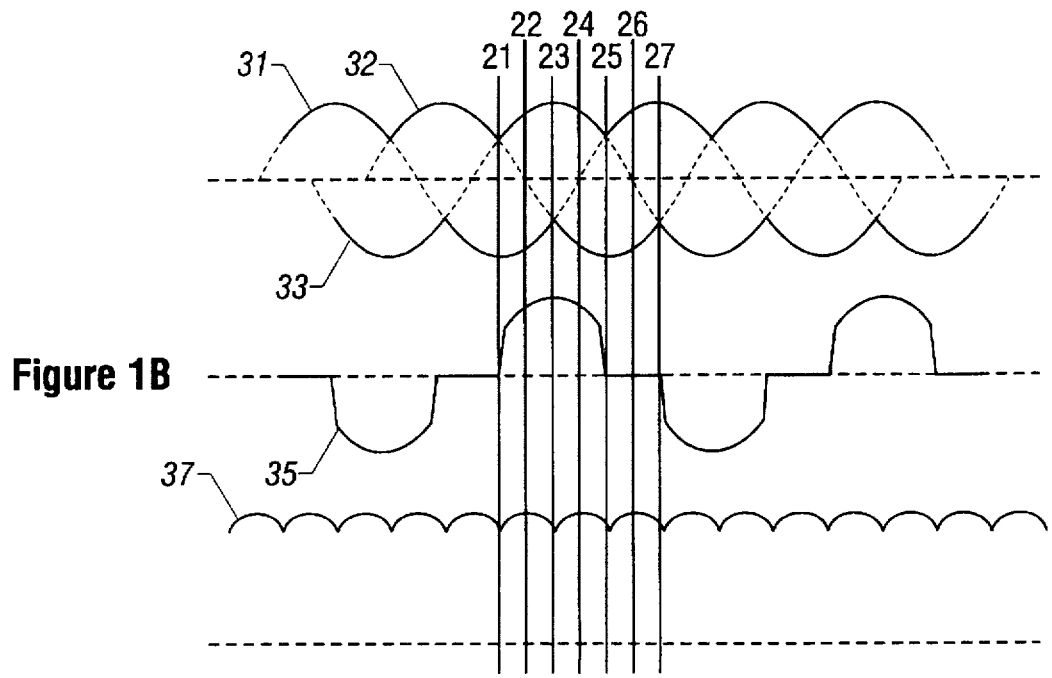
FIG. 1B shows voltage and current waveforms for the prior art method of FIG. 1A.

FIG. 1B shows the ideal voltage and current waveforms associated with this full wave rectifier. The top part of FIG. 1B shows the voltages of each phase relative to the common neutral. These are labeled 31, 32 and 33 and are shown 120° out of phase with each other. The six diode rectifier bridge selectively applies the most positive and the most negative potential of each alternator phase to the load. These most positive and negative portions can be seen as the solid portions of the curves 31, 32 and 33. Between time reference points 21 through 25, the voltage from phase C is the most positive. Therefore, its voltage is applied to the positive side of the load. Likewise, from time reference points 23 through 27, phase B is the most negative and applied to the negative side of the load.

The middle part of FIG. 1B shows the phase current, 35, for phase C of the alternator. Between time intervals 21 through 25, the phase current is positive, as would be expected. However, during the time interval 25 through 26, the phase C voltage is still positive but the phase C current is zero. During this interval, phase C could be delivering power but is not. This is a major problem with diode rectification. As a result of this, a three phase full wave rectified load has a power factor less than unity.

The rectified voltage, 37, is shown in the bottom part of FIG. 1B. Note that the minima of this trace occur at times 21, 23, 25 and 27, these being the times when one phase just begins to conduct and take the load from another phase. This minimum voltage can become a problem whenever the inductances of the alternator are relatively large, a situation that occurs when the diameter of the alternator is small. Referring to the phase C current 35 at times 21 and 25, the current must change rapidly from zero to a fairly large value. Inductors do not change current rapidly. This can produce unacceptable sags in the rectified output during heavy load conditions. Consequently, the output capacitor, C, must be sized to support the load during these phase current conditions.

Figure 2A:
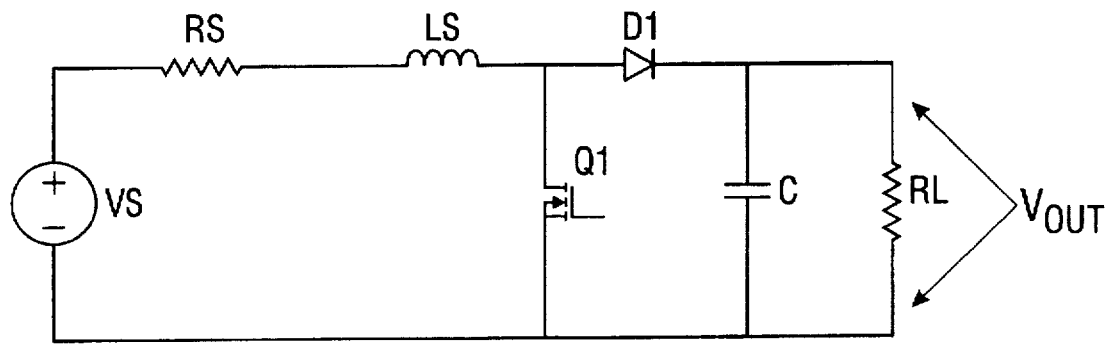
FIGS. 2A and 2B show a prior art method for boosting the voltage of a power supply and its performance characteristics.

The second piece of prior art that is of relevance is the boost mode regulator. FIG. 2A shows this for a DC power source, VS, connected to a resistance R and inductance L, connected to a resistive load RL. A Field Effect Transistor (FET), Q1, is used to short series connected source circuit. The time that Q1 is shorted is assumed to be short relative to the time constant of τ of the source defined by $$\tau = L/R \quad (1)$$

During this shorting interval, the current through LS increases linearly. When Q1 is turned off, the voltage across L reverses. This condition is called the inductor flyback. In this condition, the voltage across the inductor adds with that of the source to produce a voltage greater than that of the source alone. The output voltage VOUT is given by $$\frac{VOUT}{VS} = \frac{(1-DC)}{(1-DC)^2 + \frac{R}{R_L}} \quad (2)$$

where DC is the on time duty cycle of the FET (defined as the ratio of the on time of the FET divided by the sum of the on time and the off time of the FET).

Figure 2B:
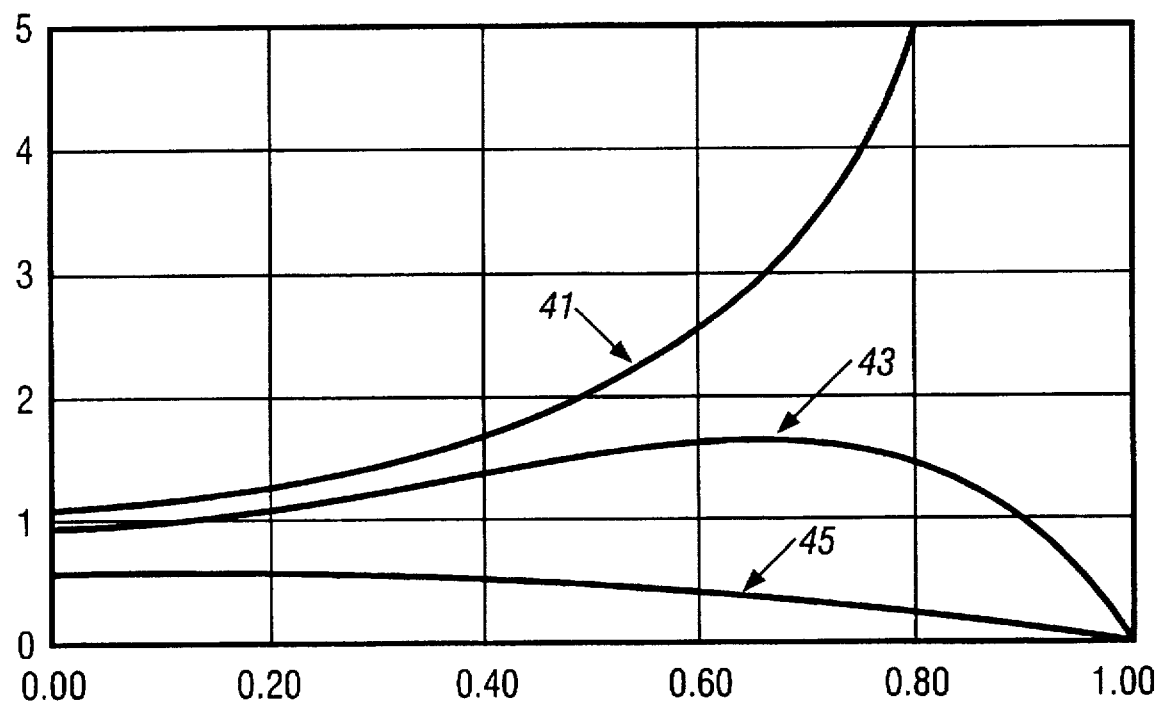

FIG. 2B shows this voltage boost graphically. The abscissa is the duty cycle DC of the FET and the ordinate is the voltage boost VOUT/VS. The curve 41 corresponds to the case where $R_L \gg R$. The curve 43 corresponds to the case when $R_L = 10 \times R$ while 45 is for the case when $R_L = R$. It can be seen that large voltage boosts can be obtained when the load resistance is much greater than the resistance in series with the source.

The Present Invention

Figure 3:
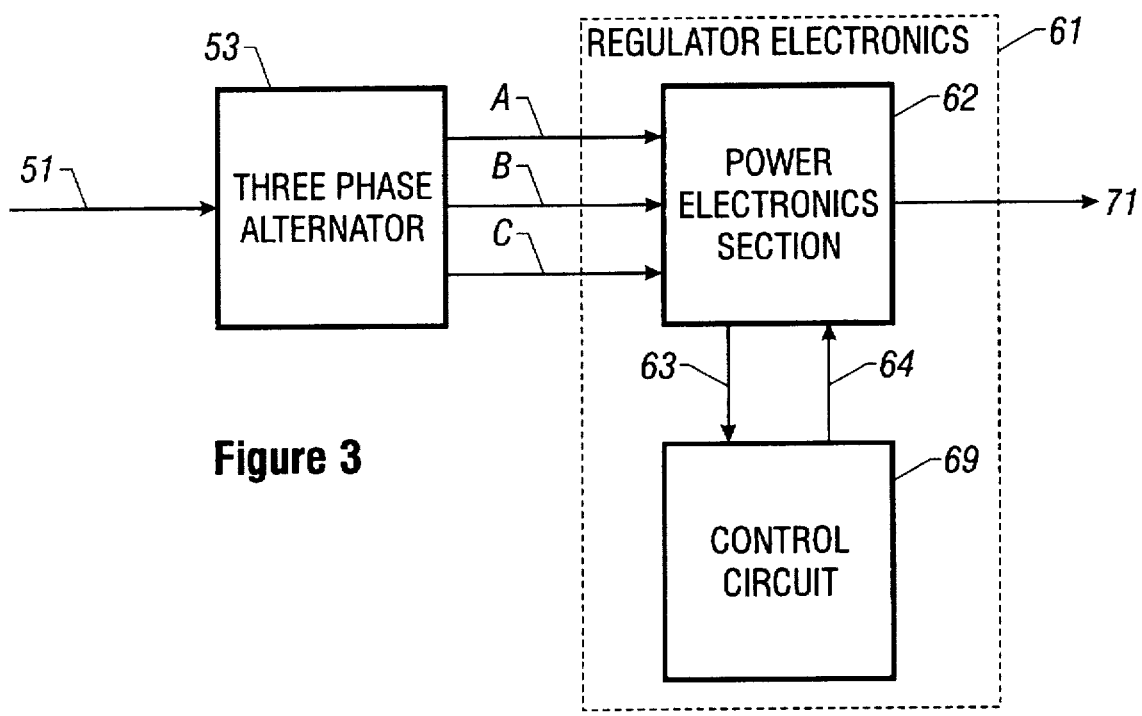
FIG. 3 shows a block diagram of a power system incorporating the preferred embodiment of the present invention.

FIG. 3 is a block diagram depicting the use of present invention. A rotor shaft drive, 51, powered by a mechanical source (not shown), drives a three phase alternator, 53. The three phases of the alternator are indicated as A, B and C. The regulator electronics, 61, includes of two main parts. The power electronics section, 62, is connected to the phases A, B and C of the alternator and has as its output a DC voltage, 71. The control circuit, 69, receives sensing signals, 63, from the power electronics section, and based upon the sensing signals, controls the operation of the power electronics section by means of drive signals, 64.

Figure 4:
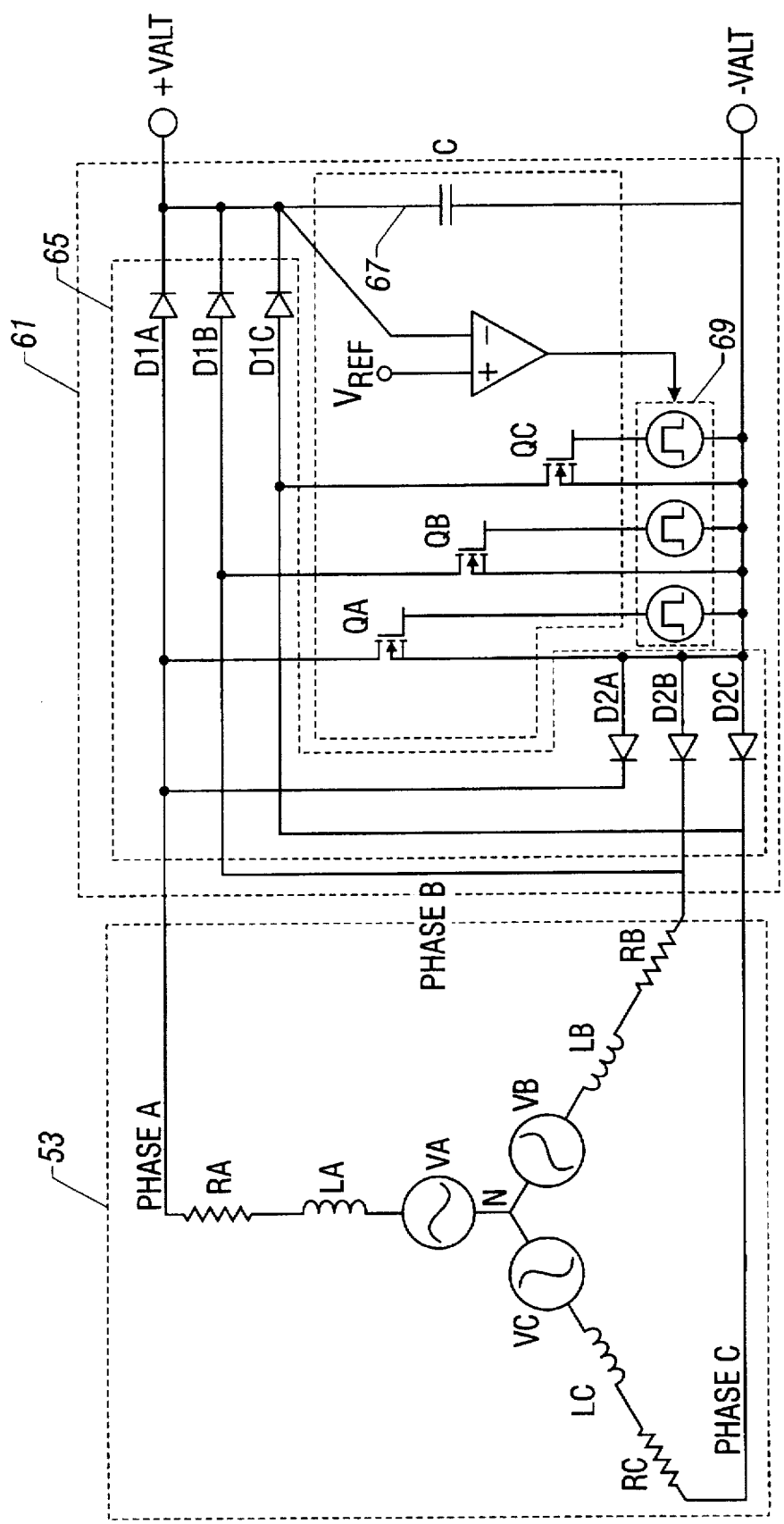
FIG. 4 shows a circuit diagram for the power components used preferred embodiment of the present invention.

FIG. 4 is a detailed illustration of a portion of the preferred embodiment of the present invention showing the alternator, 53, connected to the power electronics section, 62. The three phases of the alternator are represented by the voltage sources VA, VB and VC; their respective resistances, RA, RB and RC; and their respective inductances, LA, LB and LC. The power electronics sections, 62, includes of a rectifier section, 65, and a power section, 67. The rectifier section, 65, includes of a six diode, full wave rectifier bridge D1A through D1C and D2A through D2C. The power section includes of three shorting FETs QA through QC and an output capacitor C. The control section 69 includes of PWM voltage sources that control the opening and closing of the FETs QA through QC. The load is attached to the output across the output capacitor. The voltage across the load is denoted by ±VALT.

Figure 5:
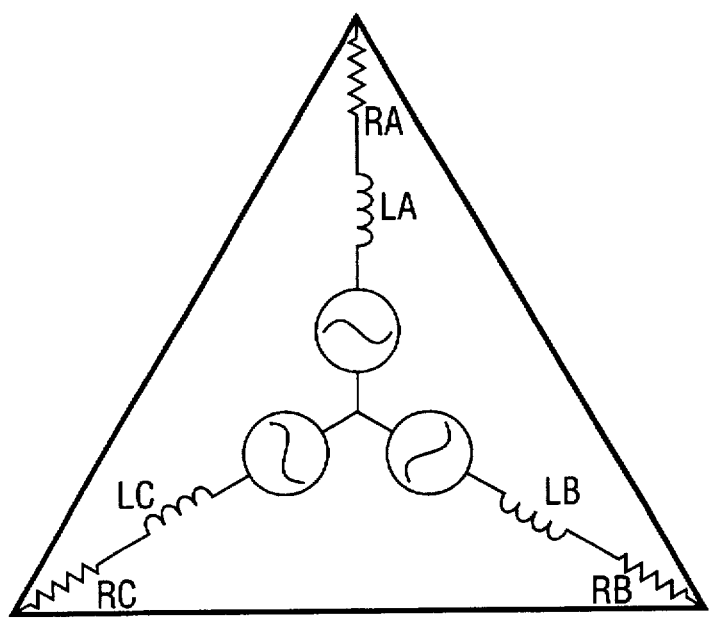
FIG. 5 shows the equivalent circuit of the alternator at one instant of time in the present invention.

FIG. 5 shows the equivalent circuit of the alternator when all three of the FETs are shorted. The device operates in a manner similar to the Boost Mode Regulator discussed above in the prior art. When the FETs short the output of the alternator, as shown in FIG. 5, the energy is stored in the alternator inductances LA, LB and LC. This is different from prior art boost mode regulators in which an additional inductance is a part of the regulator. Instead, the internal inductance of the three phases of the alternator themselves function as the flyback. When the FETs are turned off, the voltage across the inductances combines with the open circuit voltages VA, VB and VC to boost the output of the alternator. The boosted output is applied through the diodes 65 to the load at the ±VALT terminals.

Figure 6:
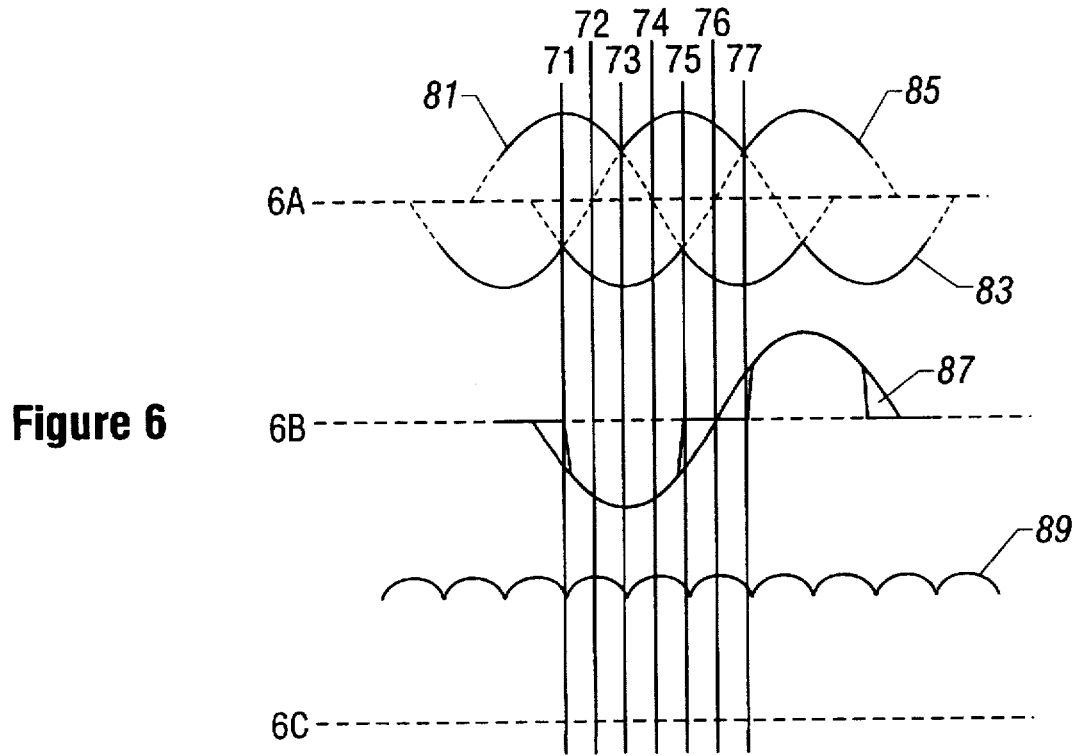
FIG. 6 shows the voltage and current waveforms associated with the present invention.
Figure 7:
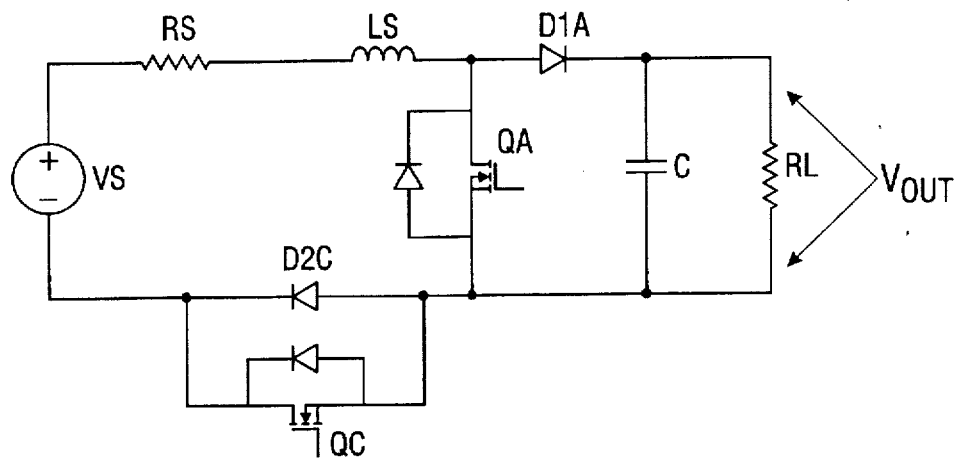
FIG. 7 shows the equivalent circuit of the present invention at one instant of time when one of the phases of the alternator is at zero voltage.
Figure 8:
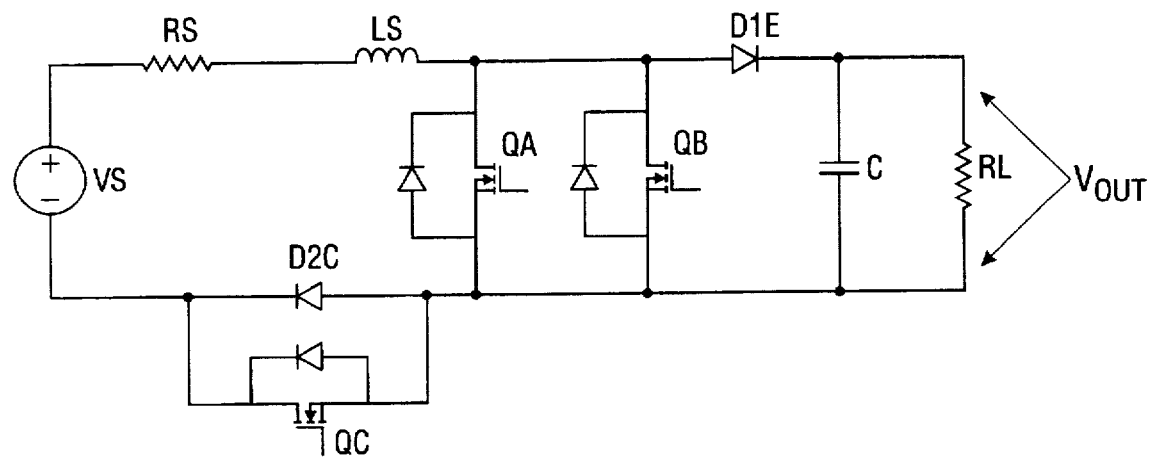
FIG. 8 shows the equivalent circuit of the present invention at another instant of time when two of the phases of the alternator are at the same positive voltage.

The operation of the invention is best understood with reference to FIGS. 6, 7 and 8. FIG. 6A depicts the voltage and current waveforms of the Boost Mode Regulator (BMR) circuit. Shown are the voltages of phase A, 81; phase B, 83 and phase C, 85. Reference times 71 through 77 are also indicated in FIG. 6A. These times will be referred to in the discussion below of the operation of the invention. FIG. 6B depicts the idealized waveform for the current in phase A, 87. FIG. 6C shows the rectified output, 89, for the case where the BMR is operating open loop or unregulated, i.e., all the FETs are open.

FIG. 7 is the equivalent circuit of the alternator-BMR circuit during reference time 72. At this time, the phase B voltage, 83, is zero and the phase A voltage, 81 and the phase C voltage, 85 have the greatest difference. At this instant in time, the following relations hold:

$$VS=VA-VC=2VA \quad (3)$$

$$RS=RA+RC=2RA \quad (4)$$

$$LS=LA+LC=2LA \quad (5)$$

and the total resistance of the two FETs in series is $$T_{total}=R_{SW}+R_{SW}=2R_{SW} \quad (6)$$

When the FETs QA and QC are turned on, no current flows through D1A and D2C. The total power losses in the loop are associated with the alternator resistance RS and resistive losses of the two FETs $R_{total}$.

The boost regulator step-up is given by $$\frac{V_{out}}{V_s} = \frac{(1-DC)}{(1-DC)^2 + \frac{R_s(1-DC)+(R_s+2R_{sw})DC}{R_L}} \quad (7)$$

One advantage of the BMR concept is that it compensates for sags in the three phase alternator output voltage. This is illustrated in FIG. 6C at reference time 73. The voltage sag appears in thee rectified output when one alternator phase is at its maximum positive or negative voltage and the other two phases begin to share the load. At this time, the other two phases sharing the current have an equal amplitude and polarity. The equivalent circuit at this time is given by FIG. 8. In FIG. 8, D1E is the lumped equivalent of diodes D1A and D1B. The following relationships hold:

$$VS=VA-VC=VB-VC \quad (8)$$

$$RS=RA\|RB+RC=1.5RA \quad (9)$$

$$LS=LA\|LB+LC=1.5LA \quad (10)$$

and $$R_{total}=R_{SW}\|R_{SW}+R_{SW}=1.5R_{SW} \quad (11).$$

Comparing equations (4) and (9), it is seen that the alternator resistive losses are reduced because of the lower equivalent resistance of the alternator. Similarly, comparing equations (5) and (10), it is seen that the equivalent inductance is also reduced at this instant in time. Those knowledgeable in the art would recognize that this leads to an increase in the power factor of the alternator output. Finally, because the current is shared between two phases, the FET losses are also reduced. As a result of this reduction in the total impedance of the alternator and the FETs there is an increase in the regulator step-up without any change in the duty cycle. The increased R step-up during alternator voltage sages is given by $$\frac{V_{out}}{V_s} = \frac{(1-DC)}{(1-DC)^2 + 0.75\frac{R_s(1-DC)+(R_s+2R_{sw})DC}{R_L}} \quad (12)$$

The alternator current $I_S$ is related to the load current $I_L$ by the relation $$\frac{I_s}{I_L} = \frac{1}{(1-DC)} \quad (13)$$

The operation of the invention is better understood by examining three illustrative examples. The examples illustrate how, by changing the duty cycle of the FETs, a constant output voltage and output current can be obtained over a wide range of alternator shaft speeds. In the preferred embodiment, this is done by the control circuit 69 mentioned above. There are two possible methods by which this can be implemented. In one realization known as voltage mode regulation, the sensing signal, 63, is obtained by comparing the desired output to the actual output voltage of the regulator voltage across the output capacitor C. This error signal is then used by the control circuit, 69, to adjust the open and close times of the FETs by means of drive signals 64. In a second realization, known as current mode regulation, the load current is then used by the control circuit, 69, to adjust the open and close times of the FETs by means of the drive signal 64. Prior art aspects of the control circuit would be familiar to those knowledgeable in the art.

EXAMPLES

Table 1 shows the efficiency of the BMR equivalent circuit of FIG. 7 for an alternator having an open circuit voltage of approximately 35 volts at 5000 rpm It is assumed that diode losses reduce the 35 volts DC output to the desired 33 volts DC level. In Table 2, the losses for the BMR circuit are computed for the alternator of Table 1 at times when the output voltage of the alternator sags. These calculations are based upon the equivalent circuit of FIG. 8.

The basic parameters of the elements of the circuit are listed in the tables and defined here as:

1. Alternator Voltage Factor—open circuit voltage per 1000 rpm.
2. Alternator Resistance—phase to phase resistance of the alternator.

3. Alternator rpm range—ratio of the highest alternator shaft speed, 5000 rpm, to the lowest speed. This lowest speed is presented in the main table and corresponds to a duty cycle of 80% for the FETs.
4. Output Power, Voltage and Current—defined at the load.
5. Output Resistance—effective load resistance calculated using the output voltage and the output current.
6. Diode voltage—assumed constant voltage drop across each diode.
7. Switch resistance—The resistance of the FETs.
8. Switch Frequency—a possible switching frequency that could be used in the preferred embodiment. It is presented here for illustrative purposes only so that AC losses associated with the switching frequency can be computed.
9. Switch C(in), C(out) and C(rt)—are the capacitance characteristics of the FET used to compute switch AC losses.
10. The Return and Shorting Switch Losses—estimated AC losses of the main switch FETs at the assumed switching frequency.

The main table headings and the method used in the calculation are described as follows:

1. Duty cycle—The FET on time duty cycle.
2. Voltage step-up—calculated using equation 7 for Table 1, equation 12 for Table 2.
3. Source voltage—the idealized source voltage Vs required to obtain the desired output voltage.
4. Source current—the idealized source current obtained using equation 13.
5. Alternator speed—the alternator speed required to obtain the desired input voltage.
6. FET-switch loss—the average DC power loss for each FET in the current path. This loss occurs only during the FET on time.
7. Diode loss—the average DC power loss for each diode in the current path. This loss occurs only during the FET off time.
8. Total regulator loss—this is the total of losses of the FETs and diodes.
9. Regulator efficiency—the output power, 100 watts, divided by the sum of the output power and the regulator losses.
10. Alternator losses—the power loss within the alternator itself and associated with the alternator resistance.
11. Input power—the input power computed using the source voltage $V_S$ and the source current $I_S$. This is used to verify the accuracy of the losses computed by other means.

In the preferred embodiment, the BMR circuit is limited to a maximum duty cycle of 80%. It can be seen from Table 1 that for duty cycles of up to this level, the dominant losses of the 33 volts DC output are associated with the diode rectifiers. Even for a 100 watt output, the total diode losses are less than 6 watts and the FET losses are never greater than 4 watts. In addition, for duty cycles of less than 80%, the efficiency of the BMR circuit is always greater than 90% even under low speed and heavy load conditions. The power loss associated with the rectifier diodes is constant.

Those knowledgeable in the art would recognize that higher BMR circuit efficiency could be achieved by replacing the diodes by synchronous rectifiers. However, the circuit would be significantly more complex. In addition, referring to FIG. 7, it can be seen that the diode D2C (an the other return current didoes D2A and D2B) in parallel with the internal drain-to-source diode of the FETs can be eliminated. In an alternate embodiment of the invention, this has, in fact, been done.

Comparison of Tables 1 and 2 show the partial compensation provided by the BMR circuit for voltage sags. As an illustrative example, during alternator voltage peaks, with an 80% duty cycle, the required alternator voltage is 9.1 volts (from Table 1) with an alternator speed of 1307 rpm. During sags, the required voltage for the same duty cycle of 80% is 8.5 volts (from Table 2). At 1307 rpm, Table 2 shows that the alternator voltage sags to approximately 7.9 volts, or approximately 13.3% less than the peak. Thus, at a fixed speed and duty cycle, the actual alternator voltage drop of 13.3% is partially compensated by a 6.5% drop in the required alternator voltage to maintain the same output voltage at the load.

Comparison of Tables 1 and 2 shows that for the 80% duty cycle, the compete alternator and regulator power system becomes more efficient during voltage sags: the input power requirement of the 100 watt output drops from 138.6 watts to 129 watts, an improvement of 6.9%.

Figure 9A:
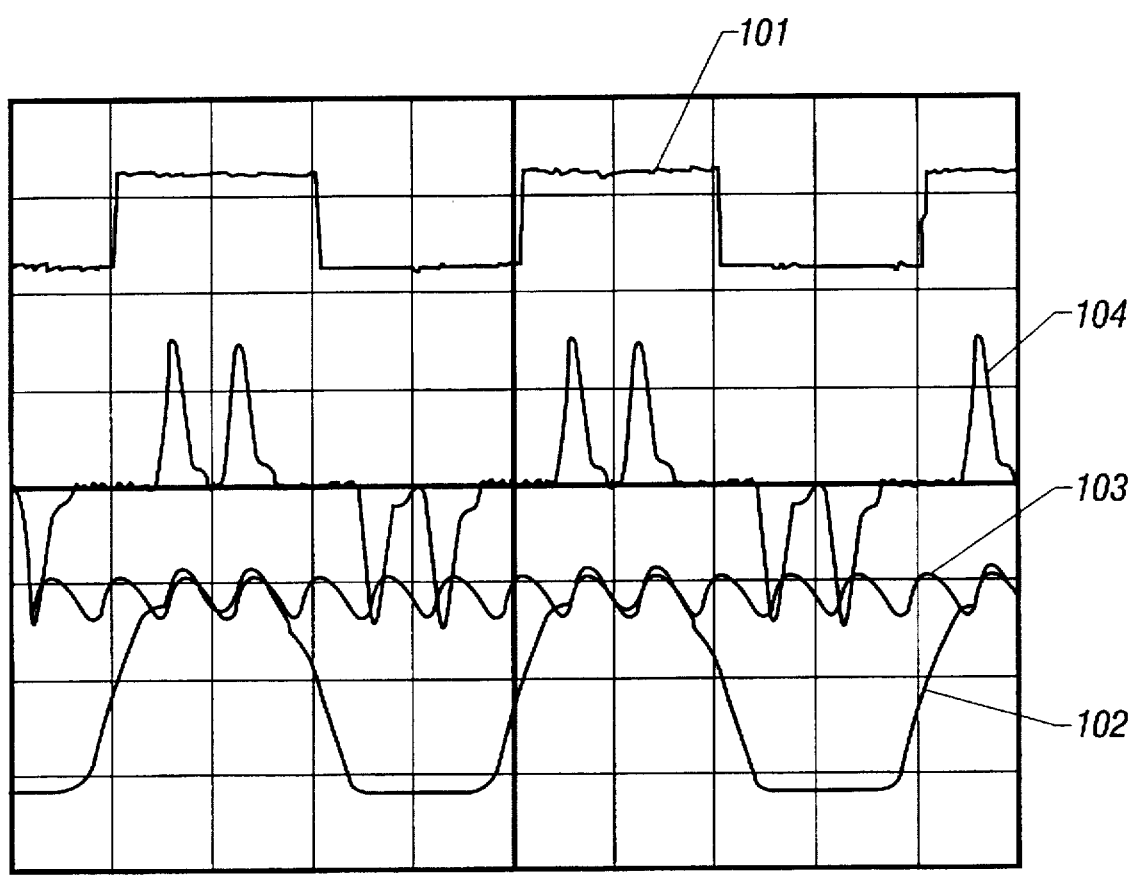
FIGS. 9A and 9B show a comparison of a phase voltage, a phase current and the rectified output when the method of the invention is disabled with the same voltages and currents when the method is enabled.

Another aspect of the invention is an improvement in the power factor of the alternator-rectifier circuit. This is best understood with reference to FIG. 9. FIG. 9A shows four waveforms for the case where the boost mode is disabled, i.e., the FETs remain in the open position. Under these conditions, the BMR circuit functions like a conventional six-diode rectifier bridge. The curve labeled 101 is a square wave pulse at the synchronous speed of the alternator. The curve labeled 102 is the phase A voltage of the alternator. Similar curves exist for the other two phases of the alternator (not shown). The curve labeled 103 is the rectified output of the circuit, i.e., the voltage across the terminals of the decoupling capacitor C. It shows a significant amount of ripple. The curve labeled 104 is the current in phase A. Comparing 102 and 104, it can be seen that there are large time intervals during which phase A has a sizeable voltage and is delivering little or no current. Those who are knowledgeable in the art would recognize that the power factor corresponding to this relation between the phase voltage and the phase current is rather low.

Figure 9B:
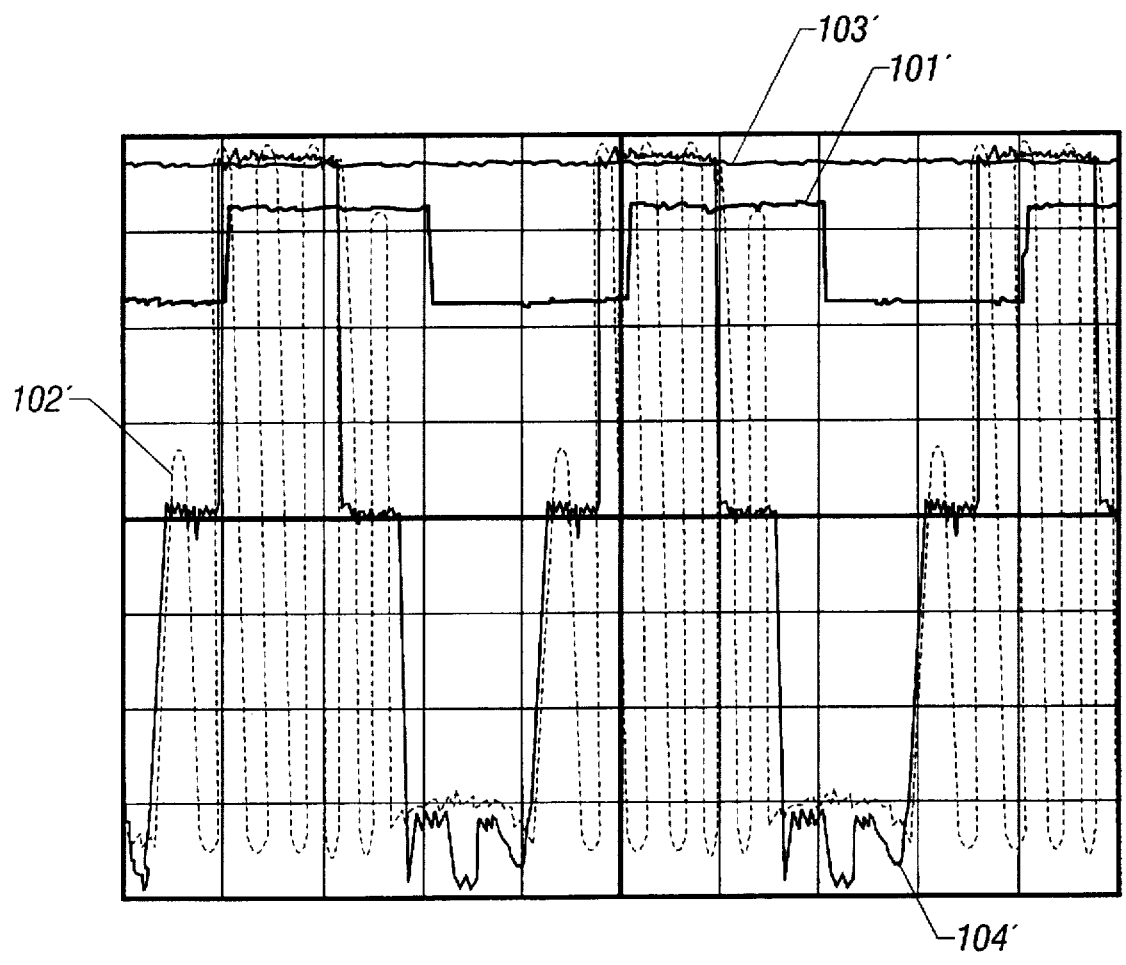

FIG. 9B shows similar curves when the boost mode is enabled, i.e., the FETs are opening and closing at a high speed. The curve labeled 101' is the same square wave pulse as 101 at the synchronous speed of the alternator. 103' is the BMR output voltage and, as can be seen, it has been boosted in comparison to 103. In addition, the ripple that was present in 103 has been almost eliminated. 102', the phase voltage curve when the BMR is enabled, requires some explanation. Because of the high frequency of the switching of the FETs, there is frequency aliasing in the display. The curve can actually be approximated by a high frequency square wave (at the FET switching frequency) modulated by a square wave at the synchronous speed of the alternator, the modulating component being advanced some 60° with respect to the waveform 101'. Comparison of 104', the current in phase A, with the phase voltage 102' shows that the phase current is more in phase with the phase voltage, i.e., it has a higher power factor, than in FIG. 9A. Experimentation with the various parameters of the invention has shown that a power factor of nearly 1.0 can be obtained by increasing the time constant of the regulator.

The foregoing description has been limited to specific embodiments of this invention. It will be apparent, however, that variations and modifications may be made to the disclosed embodiments, with the attainment of some or all of the advantages of the invention. Therefore, it is the object of the appended claims to cover all such variations and modifications as come within the true spirit and scope of the invention

TABLE 1

| Alternator Voltage Factor = | 7 V/1000 RPM |
| --- | --- |
| Alternator Resistance = | 0.12 Ohm phase-to-phase |
| Alternator RPM Range = | 3.83: 1 |
| Output Power = | 100 Watts |
| Output Voltage = | 33 Volts |
| Output Current = | 3.03 Amp |
| Output Resistance = | 10.89 Ohms |
| Diode Voltage = | 1 Volt |
| Switch Resistance = | 0.01 Ohms |
| Switch Frequency = | 100 kHz |
| Switch C(in) = | 3920 pF |
| Switch C(out) = | 1300 pF |
| Switch C(rt) = | 252 pF |
| Return Switch Gate Loss = | 0.020 Watts |
| Shorting Switch Gate Loss = | 0.024 Watts |
| Shorting Switch Drain Loss = | 0.075 Watts |

| | | | | | DC Power Losses | | | | | |
| --- | --- | --- | --- | --- | --- | --- | --- | --- | --- | --- |
| Duty Cycle (%) | Voltage Step-Up | Source Voltage (Volts) | Source Current (Amps) | Alternator Speed (RPM) | FET Switch (Watts) | Diode Loss (Watts) | Total Regulator (Watts) | Regulator Efficiency | Alternator Loss (Watts) | Input Power (Watts) |
| 95 | 3.32 | 10.5 | 60.61 | 1506 | 34.89 | 3.03 | 75.85 | 0.57 | 432.5 | 638.8 |
| 90 | 4.45 | 7.9 | 30.30 | 1123 | 8.26 | 3.03 | 22.59 | 0.82 | 108.1 | 238.3 |
| 85 | 4.30 | 8.1 | 20.20 | 1162 | 3.47 | 3.03 | 13.00 | 0.88 | 48.1 | 164.4 |
| 80 | 3.83 | 9.1 | 15.15 | 1307 | 1.84 | 3.03 | 9.73 | 0.91 | 27.0 | 138.6 |
| 75 | 3.35 | 10.5 | 12.12 | 1494 | 1.10 | 3.03 | 8.26 | 0.92 | 17.3 | 126.7 |
| 70 | 2.94 | 11.9 | 10.10 | 1702 | 0.71 | 3.03 | 7.49 | 0.93 | 12.0 | 120.3 |
| 65 | 2.60 | 13.5 | 8.66 | 1922 | 0.49 | 3.03 | 7.04 | 0.93 | 8.8 | 116.5 |
| 60 | 2.33 | 15.0 | 7.58 | 2149 | 0.34 | 3.03 | 6.75 | 0.94 | 6.8 | 114.0 |
| 55 | 2.10 | 16.7 | 6.73 | 2381 | 0.25 | 3.03 | 6.56 | 0.94 | 5.3 | 112.3 |
| 50 | 1.91 | 18.3 | 6.06 | 2617 | 0.18 | 3.03 | 6.43 | 0.94 | 4.3 | 111.0 |
| 45 | 1.75 | 20.0 | 5.51 | 2856 | 0.14 | 3.03 | 6.33 | 0.94 | 3.6 | 110.1 |
| 40 | 1.61 | 21.7 | 5.05 | 3096 | 0.10 | 3.03 | 6.26 | 0.94 | 3.0 | 109.5 |
| 35 | 1.50 | 23.4 | 4.66 | 3338 | 0.08 | 3.03 | 6.21 | 0.94 | 2.6 | 108.9 |
| 30 | 1.40 | 25.1 | 4.33 | 3581 | 0.06 | 3.03 | 6.17 | 0.94 | 2.2 | 108.5 |
| 25 | 1.31 | 26.8 | 4.04 | 3825 | 0.04 | 3.03 | 6.14 | 0.94 | 1.9 | 108.2 |
| 20 | 1.23 | 28.5 | 3.79 | 4070 | 0.03 | 3.03 | 6.12 | 0.94 | 1.7 | 107.9 |
| 15 | 1.16 | 30.2 | 3.57 | 4315 | 0.02 | 3.03 | 6.10 | 0.94 | 1.5 | 107.7 |
| 10 | 1.10 | 31.9 | 3.37 | 4561 | 0.01 | 3.03 | 6.08 | 0.94 | 1.3 | 107.5 |
| 5 | 1.04 | 33.7 | 3.19 | 4807 | 0.01 | 3.03 | 6.07 | 0.94 | 1.2 | 107.3 |
| 0 | 0.99 | 35.4 | 3.03 | 5054 | 0.00 | 3.03 | 6.06 | 0.94 | 1.1 | 107.2 |

TABLE 2

| Alternator Voltage Factor = | 6.062 V/1000 RPM |
| --- | --- |
| Alternator Resistance = | 0.12 Ohm phase-to-phase |
| Alternator RPM Range = | 3.56: 1 |
| Output Power = | 100 Watts |
| Output Voltage = | 33 Volts |
| Output Current = | 3.03 Amp |
| Output Resistance = | 10.89 Ohms |
| Diode Voltage = | 1 Volt |
| Switch Resistance = | 0.01 Ohms |
| Switch Frequency = | 100 kHz |
| Switch C(in) = | 3920 pF |
| Switch C(out) = | 1300 pF |
| Switch C(rt) = | 252 pF |
| Return Switch Gate Loss = | 0.020 Watts |
| Shorting Switch Gate Loss = | 0.024 Watts |
| Shorting Switch Drain Loss = | 0.075 Watts |

| | | | | | DC Power Losses | | | | | |
| --- | --- | --- | --- | --- | --- | --- | --- | --- | --- | --- |
| Duty Cycle (%) | Voltage Step-Up | Source Voltage (Volts) | Source Current (Amps) | Alternator Speed (RPM) | FET Switch (Watts) | Diode Loss (Watts) | Total Regulator (Watts) | Regulator Efficiency | Alternator Loss (Watts) | Input Power (Watts) |
| 95 | 4.44 | 7.9 | 60.61 | 1301 | 34.89 | 3.03 | 58.40 | 0.63 | 324.4 | 477.8 |
| 90 | 5.34 | 6.6 | 30.30 | 1081 | 8.26 | 3.03 | 18.46 | 0.84 | 81.1 | 198.6 |
| 85 | 4.81 | 7.3 | 20.20 | 1201 | 3.47 | 3.03 | 11.26 | 0.90 | 36.0 | 147.0 |
| 80 | 4.11 | 8.5 | 15.15 | 1405 | 1.84 | 3.03 | 8.82 | 0.92 | 20.3 | 129.0 |

TABLE 2-continued

| | | | | | | | | | | |
|---|---|---|---|---|---|---|---|---|---|---|
| 75 | 3.51 | 10.0 | 12.12 | 1643 | 1.10 | 3.03 | 7.71 | 0.93 | 13.0 | 120.7 |
| 70 | 3.04 | 11.5 | 10.10 | 1897 | 0.71 | 3.03 | 7.13 | 0.93 | 9.0 | 116.2 |
| 65 | 2.67 | 13.1 | 8.66 | 2162 | 0.49 | 3.03 | 6.79 | 0.94 | 6.6 | 113.5 |
| 60 | 2.37 | 14.7 | 7.58 | 2432 | 0.34 | 3.03 | 6.58 | 0.94 | 5.1 | 111.7 |
| 55 | 2.13 | 16.4 | 6.73 | 2707 | 0.25 | 3.03 | 6.43 | 0.94 | 4.0 | 110.5 |
| 50 | 1.93 | 18.1 | 6.06 | 2984 | 0.18 | 3.03 | 6.34 | 0.94 | 3.2 | 109.6 |
| 45 | 1.77 | 19.8 | 5.51 | 3264 | 0.14 | 3.03 | 6.27 | 0.94 | 2.7 | 109.0 |
| 40 | 1.63 | 21.5 | 5.05 | 3545 | 0.10 | 3.03 | 6.21 | 0.94 | 2.3 | 108.5 |
| 35 | 1.51 | 23.2 | 4.66 | 3827 | 0.08 | 3.03 | 6.17 | 0.94 | 1.9 | 108.2 |
| 30 | 1.40 | 24.9 | 4.33 | 4110 | 0.06 | 3.03 | 6.14 | 0.94 | 1.7 | 107.9 |
| 25 | 1.31 | 26.6 | 4.04 | 4394 | 0.04 | 3.03 | 6.12 | 0.94 | 1.4 | 107.6 |
| 20 | 1.23 | 28.4 | 3.79 | 4678 | 0.03 | 3.03 | 6.10 | 0.94 | 1.3 | 107.4 |
| 15 | 1.16 | 30.1 | 3.57 | 4963 | 0.02 | 3.03 | 6.09 | 0.94 | 1.1 | 107.3 |
| 10 | 1.10 | 31.8 | 3.37 | 5249 | 0.01 | 3.03 | 6.08 | 0.94 | 1.0 | 107.1 |
| 5 | 1.04 | 33.6 | 3.19 | 5534 | 0.01 | 3.03 | 6.07 | 0.94 | 0.9 | 107.0 |
| 0 | 0.99 | 35.3 | 3.03 | 5820 | 0.00 | 3.03 | 6.06 | 0.94 | 0.8 | 106.9 |

What is claimed is:

1. A voltage regulator connected to an a.c. voltage source having an internal inductance, comprising:
   (a) a rectifier for converting the a.c voltage from the source thereof to a d.c. voltage; and
   (b) a power circuit operatively coupled to the rectifier for selectively shorting the a.c. voltage from the source thereof so as to store electrical energy within the internal inductance of the a.c. source.

2. A voltage regulator connected to an a.c. voltage source having an internal inductance, comprising:
   (a) a rectifier for converting the a.c voltage from the a source thereof to a d.c. voltage;
   (b) a power circuit having an on-time duty cycle associated therewith, said power circuit being operatively coupled to the rectifier for selectively shorting the a.c. voltage source so as to store electrical energy within the internal inductance of the a.c. source; and
   (c) a control circuit operatively coupled to the power circuit for regulating the on-time duty cycle of the power circuit to maintain a substantially constant d.c. voltage output from the power circuit.

3. The voltage regulator of claim 2 wherein the control circuit senses the difference between the d.c. voltage output from the power circuit and a desired d.c. voltage.

4. An apparatus for providing regulated d.c. voltage, comprising:
   (a) an alternator for providing a.c. voltage, said alternator having an internal inductance;
   (b) a rectifier circuit coupled to the alternator for converting the a.c voltage from the alternator to a d.c. voltage;
   (b) a power circuit having an on-time duty cycle associated therewith, said power circuit being operatively coupled to the rectifier circuit for selectively shorting the a.c. voltage from the alternator so as to store electrical energy within the internal inductance of the alternator; and
   (c) a control circuit operatively coupled to the power circuit for regulating the on-time duty cycle of the power circuit to maintain a substantially constant d.c. voltage output from the power circuit.

5. The apparatus according to claim 4, wherein the alternator has three phases, each said phase having an internal inductance and an associated resistance therewith, the internal inductances of the three phases defining the internal inductance of the alternator.

6. The apparatus according to claim 5, wherein the internal inductances of the three phases and their associated resistances define a time constant of the alternator.

7. The apparatus according to claim 5, wherein the rectifier section includes at least one diode coupled to each of the three phases of the alternator.

8. The apparatus according to claim 5, wherein the power circuit includes a separate field effect transistor ("FET") coupled to each of the three phases of the alternator, each such FET acting as a switch that turns on for a predetermined time period and turns off for a predetermined time period.

9. The apparatus according to claim 8, wherein the turn-on time defines an on-time duty cycle of the power circuit.

10. The apparatus according to claim 9, wherein the control circuit is adapted to adjust the on-time duty cycle within a predetermined range.

11. The voltage regulator of claim 4 wherein the control circuit senses the difference between the d.c. voltage output from the power circuit and a desired d.c. voltage.

12. A method of regulating a.c. voltage output from a source thereof, said source having an internal inductance, comprising:
   (a) rectifying the a.c voltage output from the source to a d.c. voltage;
   (b) selectively shorting the a.c voltage output from the source for predetermined time periods so as to store electrical energy within the internal inductance of the a.c. voltage source, the predetermined time periods defining an on-time duty cycle;
   (c) regulating the on-time duty cycle so as to obtain a response characteristic selected from the group consisting (i) a unity power factor of a d.c. load coupled to a voltage regulator and (ii) a substantially constant d.c. voltage output.

13. The method of regulating a.c. voltage output according to claim 12, wherein the a.c. voltage source is a three-phase alternator, each such phase having an inductance and a resistance associated therewith and wherein the inductances of the three phases define the internal inductance of the three-phase alternator.

14. The method of regulating a.c. voltage output according to claim 13, wherein the rectifying is performed by a rectifier having at least one diode coupled to each of the three phases of the alternator.

15. The method of regulating a.c. voltage output according to claim 13, wherein selectively shorting the a.c. output is performed by a power circuit having a separate field effect transistor ("FET") coupled to each of the three phases of the alternator, each such FET acting as a switch that turns on for a predetermined time period and turns off for a predetermined time period.

16. The method of regulating a.c. voltage output according to claim 13, wherein the internal inductances of the three phases and their associated resistances define a time constant of the alternator.

17. The method of regulating a.c. voltage output according to claim 12 further comprising adjusting the on-time duty cycle within a predetermined range.

18. An apparatus for providing regulated d.c. current, comprising:

(a) an alternator for providing a.c. voltage, said alternator having an internal inductance;

(b) a rectifier circuit coupled to the alternator for converting the a.c voltage from the alternator to a d.c. voltage;

(b) a power circuit having an on-time duty cycle associated therewith, said power circuit being operatively coupled to the rectifier circuit for selectively shorting the a.c. voltage from the alternator so as to store electrical energy within the internal inductance of the alternator; and (c) a control circuit operatively coupled to the power circuit for regulating the on-time duty cycle of the power circuit to maintain a substantially constant d.c. current output from the power circuit.

19. The voltage regulator of claim 18 wherein the control circuit senses the difference between the d.c. current output from the power circuit and a desired d.c. current.

20. A voltage regulator connected to an a.c.voltage source having an internal inductance, comprising:

(a) a rectifier for converting the a.c voltage from the a source thereof to a d.c. voltage;

(b) a power circuit having an on-time duty cycle associated therewith, said power circuit being operatively coupled to the rectifier for selectively shorting the a.c. voltage source so as to store electrical energy within the internal inductance of the a.c. source; and (c) a control circuit operatively coupled to the power circuit for regulating the on-time duty cycle of the power circuit to maintain a substantially constant d.c. current output from the power circuit.

21. The voltage regulator of claim 20 wherein the control circuit senses the difference between the d.c. current output from the power circuit and a desired d.c. current.

22. A voltage regulator connected to an a.c. voltage source having an internal inductance, comprising:

(a) a rectifier for converting the a.c voltage from the source thereof to a d.c. voltage;

(b) a power circuit having an on-time duty cycle associated therewith, said power circuit being operatively coupled to the rectifier for selectively shorting the a.c. voltage source so as to store electrical energy within the internal inductance of the a.c. source; and (c) a control circuit operatively coupled to the power circuit for regulating the on-time duty cycle of the power circuit to maintain a unity power factor of a d.c. load coupled to the voltage regulator.

* * * * *